United States Patent
Fan et al.

(10) Patent No.: US 11,657,216 B2
(45) Date of Patent: May 23, 2023

(54) INPUT TEXT MANAGEMENT

(71) Applicant: International Business Machines Corporation, Armonk, NY (US)

(72) Inventors: Fei Fan, Xi'an (CN); Lin Yan Wu, Xi'an (CN); Xue Ying Zhang, Xi'an (CN); Jing Xu, Xi'an (CN); Yan Yan Han, Xi'an (CN); Yun Bo Zhang, Weifang (CN); Tao Wen, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/325,457

(22) Filed: May 20, 2021

(65) Prior Publication Data

US 2022/0374587 A1 Nov. 24, 2022

(51) Int. Cl.
*G06F 40/177* (2020.01)
*G06N 3/08* (2023.01)

(52) U.S. Cl.
CPC ............. *G06F 40/177* (2020.01); *G06N 3/08* (2013.01)

(58) Field of Classification Search
CPC ................................ G06F 40/177; G06N 3/08
See application file for complete search history.

(56) References Cited

U.S. PATENT DOCUMENTS

| | | | |
|---|---|---|---|
| 8,588,825 B2 | 11/2013 | Jonsson | |
| 2005/0081150 A1* | 4/2005 | Beardow | H04W 88/184 715/256 |
| 2009/0292784 A1* | 11/2009 | Leedberg | H04L 51/212 709/206 |
| 2013/0185332 A1 | 7/2013 | Koide et al. | |
| 2014/0267045 A1* | 9/2014 | Grieves | G06F 40/274 704/10 |
| 2017/0147655 A1 | 5/2017 | Aaron et al. | |
| 2017/0249017 A1* | 8/2017 | Ryu | G06F 3/018 |
| 2018/0225306 A1* | 8/2018 | He | G06Q 50/01 |
| 2022/0083919 A1* | 3/2022 | Deep | G06N 3/0454 |

OTHER PUBLICATIONS

Anonymous, "Personalized mail rendering method with text mining and user behavior analysis", An IP.com Prior Art Database Technical Disclosure, IP.com No. IPCOM000254156D, IP.com Electronic Publication Date: Jun. 5, 2018, 6 pages.

Anonymous, "Method and System for Automatic Text Font Size Substitution", An IP.com Prior Art Database Technical Disclosure, IP.com No. IPCOM000264588D, IP.com Electronic Publication Date: Jan. 11, 2021, 5 pages.

Mell et al., "The NIST Definition of Cloud Computing", Recommendations of the National Institute of Standards and Technology, Sep. 2011, 7 pages.

* cited by examiner

Primary Examiner — Thu V Huynh
(74) Attorney, Agent, or Firm — James L. Olsen (57) ABSTRACT

Aspects of the present disclosure relate to input text management. Input text can be received from a user. A set of key elements can be extracted from the input text. A determination can be made whether the user is mapped to an existing cluster. In response to determining that the user is mapped to an existing cluster, a structured table mapping key elements to text modifications can be referenced. The input text can be modified according to the structured table mapping key elements to text modifications, wherein the existing cluster is associated with a text modification scheme within the structured table, wherein the text modification scheme includes a first mapping of key elements to text modifications.

20 Claims, 7 Drawing Sheets

INPUT TEXT MANAGEMENT

BACKGROUND

The present disclosure relates generally to the field of computing, and in particular, to input text management.

SUMMARY

Embodiments of the present disclosure include a method, system, and computer program product for input text management. Input text can be received from a user. A set of key elements can be extracted from the input text. A determination can be made whether the user is mapped to an existing cluster. In response to determining that the user is mapped to an existing cluster, a structured table mapping key elements to text modifications can be referenced. The input text can be modified according to the structured table mapping key elements to text modifications, wherein the existing cluster is associated with a text modification scheme within the structured table, wherein the text modification scheme includes a first mapping of key elements to text modifications.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of computing, and in particular, to input text management. While the present disclosure is not necessarily limited to such applications, various aspects of the disclosure can be appreciated through a discussion of various examples using this context.

There are various platforms and systems that allow communication through text. Commonly, a user will format the text they are transmitting prior to transmission, for example, by modifying font, size, color, and other attributes (e.g., bold, italics, etc.) of the text. Upon receipt by a receiver (e.g., a receiver device), the receiver terminal may modify the text per the formats available to the receiver, for example, to attempt to maintain the text properties transmitted within the input text. However, formatting text can be a tedious process, as one or more attributes (e.g., font, size, color, italics, etc.) may be required to be manually modified for specific portions of the input text. For example, a user may be required to manually select (e.g., by highlighting text) a first portion of text and modify the first portion of text with a first text modifier, manually select a second portion of text and modify the second portion of text with a second modifier, etc. There is a need for methods and systems that can automatically modify text prior to transmission to a receiver.

Aspects of the present disclosure relate to input text management. Input text can be received from a user. A set of key elements can be extracted from the input text. A determination can be made whether the user is mapped to an existing cluster. In response to determining that the user is mapped to an existing cluster, a structured table mapping key elements to text modifications can be referenced. The input text can be modified according to the structured table mapping key elements to text modifications, where the existing cluster is associated with a text modification scheme within the structured table, where the text modification scheme includes a first mapping of key elements to text modifications.

Aspects of the present disclosure provide various advantages. By automatically modifying text according to how users typically modify text (according to clusters mapped to text modification schemes), time spent modifying text (e.g., highlighting text and selecting a corresponding modification) can be reduced. Further, recipients of the text can readily ascertain important details (according to key element categories) from the received text. Further still, because aspects of the present disclosure automatically classify users into clusters specifying text modification schemes based on their text history, little user intervention is required. Additionally, infrequent text modifications made by users can be captured within user history data and accounted for when classifying the user into a corresponding text modification scheme. As a result, usability of text transmission platforms can be greatly enhanced by aspects of the present disclosure.

Figure 1:
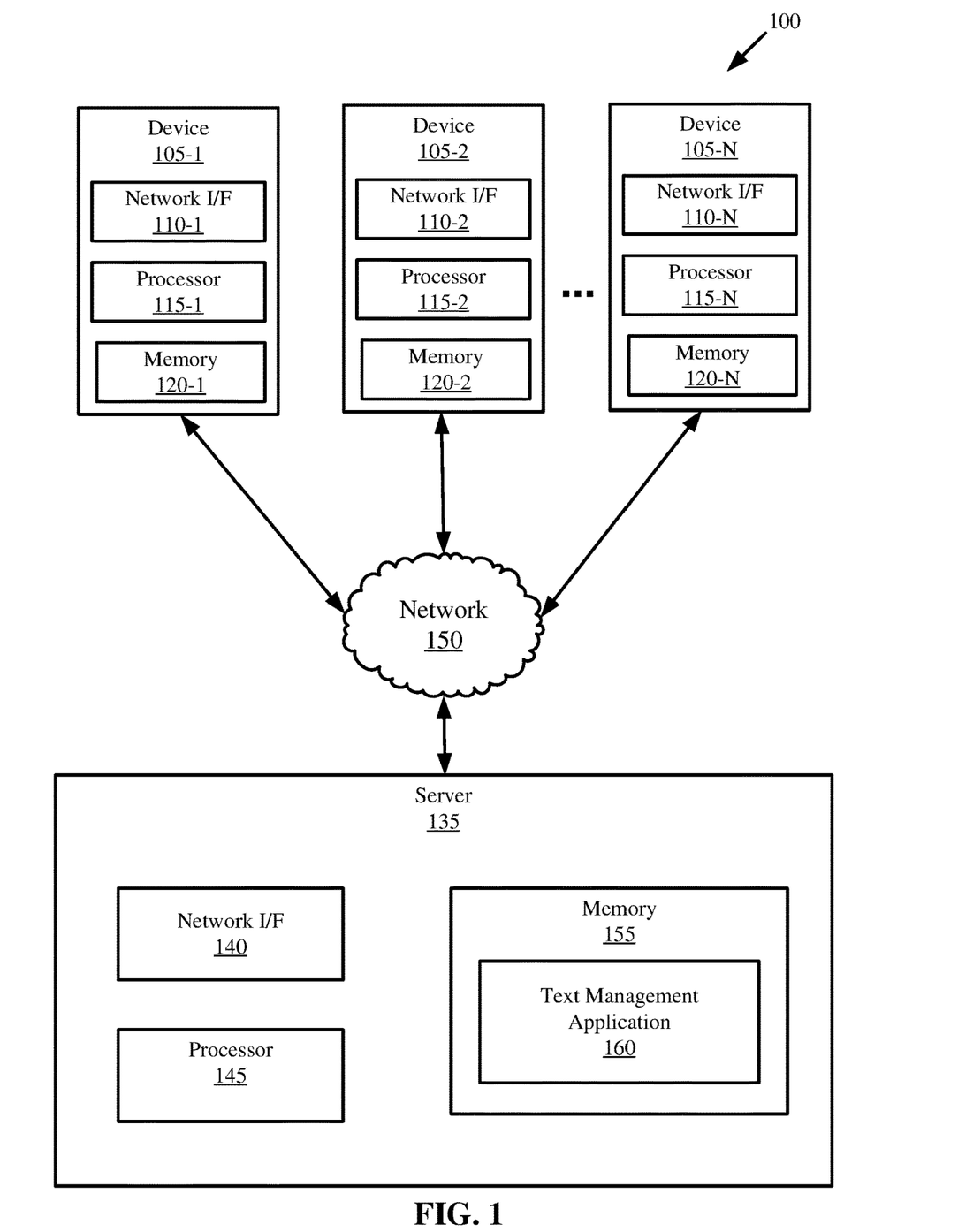
FIG. 1 is a block diagram illustrating an example computing environment in which illustrative embodiments of the present disclosure can be implemented.

Turning now to the figures, FIG. 1 is a block diagram illustrating an example computing environment 100 in which illustrative embodiments of the present disclosure can be implemented. Computing environment 100 includes a plurality of devices 105-1, 105-2 . . . 105-N (collectively devices 105), at least one server 135, and a network 150.

The devices 105 and the server 135 include one or more processors 115-1, 115-2 . . . 115-N (collectively processors 115) and 145 and one or more memories 120-1, 120-2 . . . 120-N (collectively memories 120) and 155, respectively. The devices 105 and the server 135 can be configured to communicate with each other through internal or external network interfaces 110-1, 110-2 . . . 110-N (collectively network interfaces 110) and 140. The network interfaces 110 and 140 are, in some embodiments, modems or network interface cards. The devices 105 and/or the server 135 can be equipped with a display or monitor. Additionally, the devices 105 and/or the server 135 can include optional input devices (e.g., a keyboard, mouse, scanner, a biometric scanner, video camera, or other input device), and/or any commercially available or custom software (e.g., browser software, communications software, server software, natural language processing software, search engine and/or web crawling software, image processing software, etc.).

The devices 105 and the server 135 can be distant from each other and communicate over a network 150. In some embodiments, the server 135 can be a central hub from which devices 105 can establish a communication connection, such as in a client-server networking model. Alternatively, the server 135 and devices 105 can be configured in any other suitable networking relationship (e.g., in a peer-to-peer (P2P) configuration or using any other network topology).

In some embodiments, the network 150 can be implemented using any number of any suitable communications media. For example, the network 150 can be a wide area network (WAN), a local area network (LAN), an internet, or an intranet. In certain embodiments, the devices 105 and the server 135 can be local to each other and communicate via any appropriate local communication medium. For example, the devices 105 and the server 135 can communicate using a local area network (LAN), one or more hardwire connections, a wireless link or router, or an intranet. In some embodiments, the devices 105 and the server 135 can be communicatively coupled using a combination of one or more networks and/or one or more local connections. For example, the first device 105-1 can be hardwired to the server 135 (e.g., connected with an Ethernet cable) while the second device 105-2 can communicate with the server 135 using the network 150 (e.g., over the Internet).

In some embodiments, the network 150 is implemented within a cloud computing environment or using one or more cloud computing services. Consistent with various embodiments, a cloud computing environment can include a network-based, distributed data processing system that provides one or more cloud computing services. Further, a cloud computing environment can include many computers (e.g., hundreds or thousands of computers or more) disposed within one or more data centers and configured to share resources over the network 150. In some embodiments, the network 150 may be substantially similar to, or the same as, cloud computing environment 50 described in FIG. 5.

The server 135 includes a text management application 160. The text management application 160 can be configured to modify (e.g., enhance, reformat, etc.) input text provided by users. Text modifications to be made for each user can be completed according to a cluster (e.g., a classified group) each user belongs to. Each user can, in embodiments, be clustered based on text history (e.g., modifications which users routinely use) using artificial intelligence (AI) and machine learning (ML) based clustering/classification approaches.

The text management application 160 can first be configured to receive input text from a user. The input text can be received in any suitable manner, such as, over network 150 or a cellular network (e.g., for text messages). For example, input text can be received from a messaging application, an email application, from a mobile terminal over a cellular network, etc. Upon receiving the input text, the input text can be preprocessed and normalized such that the input text can be further processed (e.g., using natural language processing (NLP) techniques). Thereafter, key elements (e.g., text elements) can be extracted from the input text. In embodiments, key elements refer to classifications of words within the input text such as, for example, names, addresses, locations, and times, though other classifications are also contemplated. Thus, key elements refer to key categories of interest within text that are desired to be modified in a particular manner. As an example, for a message, "John will meet me at the bank around 2:00 PM," the word "John" can be extracted as a "name," the word "bank" can be extracted as a "location," and the phrase "2:00 PM" can be extracted as a "time." Thus, the words "John," "bank," and "2:00 PM" can be extracted from the text and classified into key elements "name," "location," and "time."

Upon extracting key elements from the input text, a determination is made whether the user belongs to an existing cluster. If the user belongs to an existing cluster, a structured table mapping text elements to text modifications can be referenced such that the input text is modified per the structured table. Following the example above, if the cluster corresponding to the user has text elements mapping to text modifications as follows: "name→bold, location→italic, and time→@," then the users input message "John will meet me at the bank around 2:00 PM" can be modified to "John will meet me at the bank at @2:00 PM." An example structured table mapping key elements to text modifications is shown and described with respect to element 225 of FIG. 2.

If the user does not belong to an existing cluster, then the user can be classified into a cluster. Classifying the user into a cluster can include analyzing text history associated with the user and determining a matching cluster based on the analyzation. In embodiments, if the user does not match an existing cluster, then a new cluster can be generated for the user. Ultimately, the user can be matched to a text modification scheme (e.g., designated by a cluster classification) indicated within a structured table such that the user's input text can be seamlessly modified according to how the user typically modifies text (e.g., based on an analysis of their text history). Upon matching the user to the existing cluster, or upon generating a new cluster for the user, the user's input text can be modified according to the cluster (e.g., as defined in a structured table, see FIG. 2).

It is noted that FIG. 1 is intended to depict the representative major components of an example computing environment 100. In some embodiments, however, individual components can have greater or lesser complexity than as represented in FIG. 1, components other than or in addition to those shown in FIG. 1 can be present, and the number, type, and configuration of such components can vary.

While FIG. 1 illustrates a computing environment 100 with a single server 135, suitable computing environments for implementing embodiments of this disclosure can include any number of servers. The various models, modules, systems, and components illustrated in FIG. 1 can exist, if at all, across a plurality of servers and devices. For example, some embodiments can include two servers. The two servers can be communicatively coupled using any suitable communications connection (e.g., using a WAN, a LAN, a wired connection, an intranet, or the Internet).

Though this disclosure pertains to the collection of personal data (e.g., text history data, identifying information, etc.), it is noted that in embodiments, users opt-in to the system. In doing so, they are informed of what data is collected and how it will be used, that any collected personal data may be encrypted while being used, that the users can opt-out at any time, and that if they opt-out, any personal data of the user is deleted.

Figure 2:
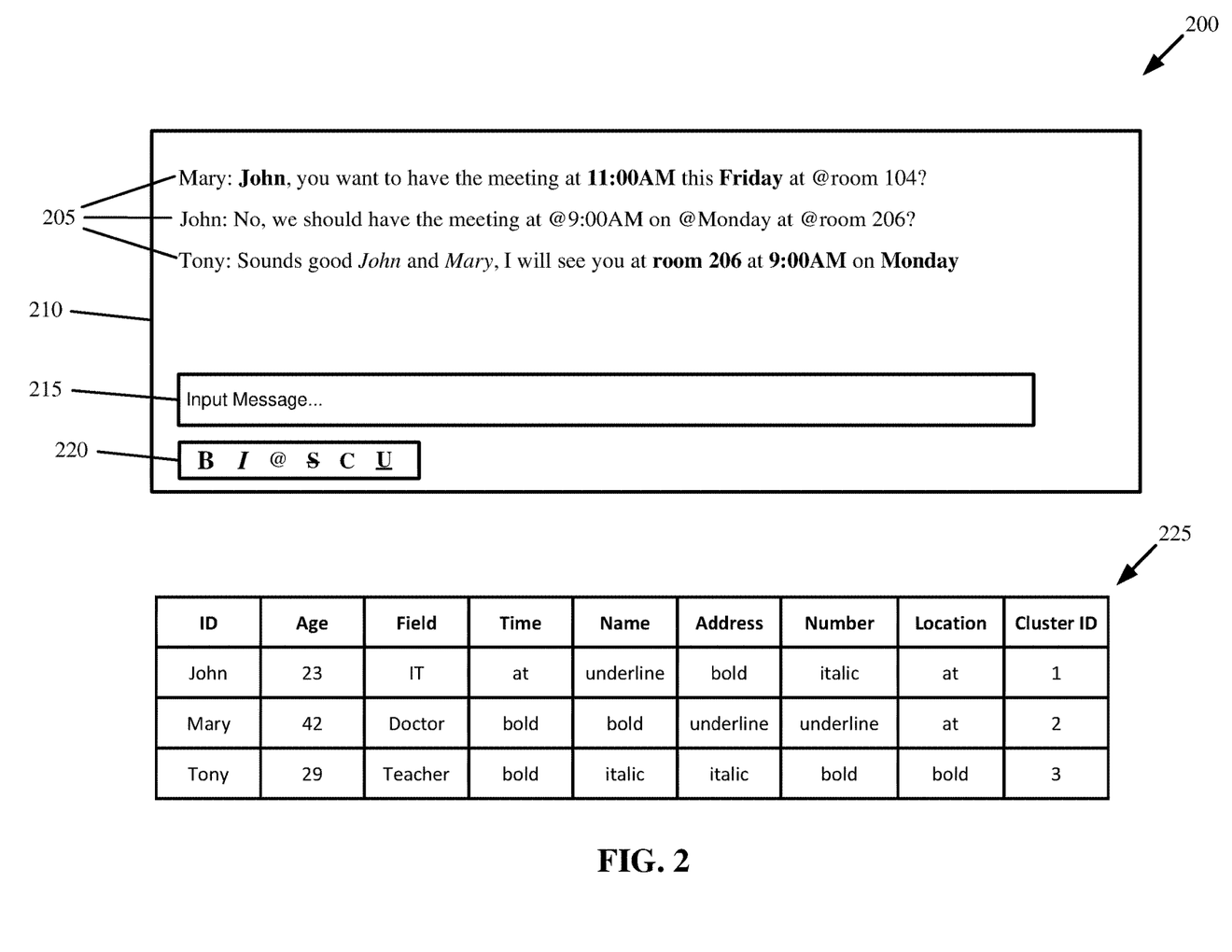
FIG. 2 is a diagram illustrating an example chat window with modified input text, in accordance with embodiments of the present disclosure.

Referring now to FIG. 2, shown is an example computing environment 200 in which illustrative embodiments of the present disclosure can be implemented. As shown in FIG. 2, a chat window 210 includes various modified input messages 205. An input message window 215 facilitates entering input messages. A set of text feature modifiers 220 can be used to modify features of text input into the input message window 215. As shown in FIG. 2, the set of text feature modifiers 220 includes a bold button ("B"), an italic button ("/"), an @ button, a strikethrough button ("S"), a color button ("C"), and an underline button ("U"), though other text feature modifiers not shown are contemplated.

The text feature modifiers 220 can allow users to manually modify portions of text they are entering into the chat window 210, for example, to bold text, italicize text, strikethrough text, colorize text, and underline text. In embodiments, manual text modifications made by users can be used as training data to cluster users into appropriate text modification schemes (e.g., designated by cluster identifications (IDs)).

Text entered by each user within input message window 215 can be modified according to table 225. In particular, structured table 225 includes clusters associated with each user, each cluster specifying a text modification scheme. For example, a first cluster corresponding to "Cluster ID 1" indicates that text is modified according to the following text element to modification mapping: time→@, name→underline, address→bold, number→italic, location 4 @. As such, because user "John" is classified as belonging to Cluster ID 1, the text from input message "No, we should have the meeting at 9:00 AM on Monday at room 206" is modified according to table 225 and output as "No, we should have the meeting at @9:00 AM, on @Monday at @room 206." Text input from users "Mary" and "Tony" is similarly modified according to structured table 225, though in accordance with the text modification schemes associated with clusters 2 and 3, respectively.

Text entered into the input message window 215 for transmission into the chat window 210 for viewing by other users can be modified prior to, during, or after transmission by the user. For example, upon a user entering input text into the input message window 215, the text entered by the user can be modified prior to transmission into chat window 210. As another example, upon a user entering input text into the input message window 215 and entering a command specifying that the text should be sent (e.g., via an "Enter" or "Send" button) the text can be modified according to table 225 prior to transmission into chat window 210. As another example, upon a user entering input text into the input message window 215 and successfully transmitting the text into the chat window 210, the text can be modified within the chat window 210 (e.g., such that the text is modified after it is transmitted). In embodiments, though not shown in FIG. 2, multiple users can belong to the same cluster such that text input by users belonging to the same cluster can be modified according to the same text modification scheme.

Though example key element categories (e.g., time, name, location, address, etc.) are shown in FIG. 2, any suitable key element categories can be extracted from text and mapped to text modifications. For example, additional text elements can include, but are not limited to, employment roles, project names, time ranges, media items, sentiment categories, etc. Further, though example text modifications are shown in table 225, any suitable text modifications can be implemented. Example text modifications include bolding, italicizing, colorizing, underlining, strikethrough, @ tags, font size alterations, font style alterations, subscripts, superscripts, and character spacing alterations.

As an example, key elements can correspond to sentiments of words or phrases within a sentence. The words and/or phrases mapping to a particular sentiment category can be textually modified according to a mapping designated within a structured table (e.g., table 225). For example, if a first word is mapped to a first sentiment category "angry" (a first key element), then a color of the first word can be altered to red (a first text modification), if a second word is mapped to a second sentiment category "sad" (a second key element), then a color of the second word can be altered to blue (a second text modification), if a third word is mapped to a third sentiment category "happy" (a third key element), then a color of the third word can be altered to yellow (a third text modification), etc.

As shown in FIG. 2, in embodiments, identifying information associated with users (e.g., age, field, identification) may be included in table 225. However, in some embodiments, users can be anonymously (e.g., cryptographically) mapped to clusters. The formatting of the table 225 can vary, and in embodiments, header information may only include key element categories (e.g., time, name, address, number, location) and not identifying information of a user (e.g., ID, age, field).

Figure 3:
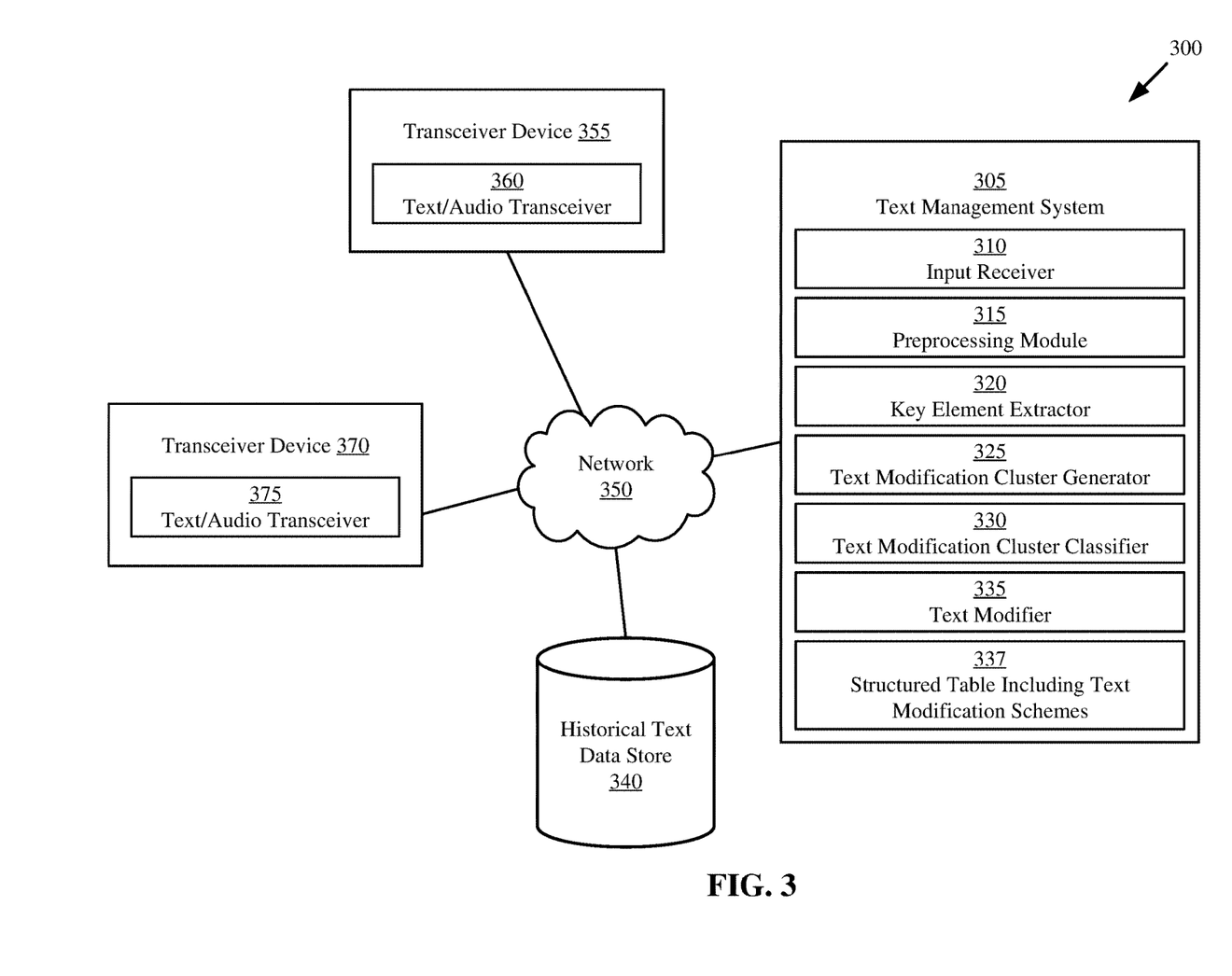
FIG. 3 is a block diagram illustrating an example computing environment in which illustrative embodiments of the present disclosure can be implemented.

Referring now to FIG. 3, shown is an example computing environment 300 in which illustrative embodiments of the present disclosure can be implemented. The computing environment 300 can include numerous components communicatively coupled by a network 350 such as, but not limited to, a text management system 305, a transceiver device 355, a transceiver device 370, and a historical text data store 340.

The text management system 305 can be configured to modify input text provided by users (e.g., via transceiver devices 355 and 370). The text management system 305 includes an input receiver 310, a preprocessing module 315, a key element extractor 320, a text modification cluster generator 325, a text modification cluster classifier 330, a text modifier 335, and a structured table including text modification schemes 337. In embodiments, functionalities of the input receiver 310, preprocessing module 315, key element extractor 320, text modification cluster generator 325, text modification cluster classifier 330, text modifier 335, and structured table including text modification schemes 337 can be processor executable instructions that can be executed by a dedicated or shared processor using received inputs.

The input receiver 310 of the text management system 305 can be configured to receive text and/or audio input from users. For example, the input receiver 310 can be configured to receive text and/or audio input from a text/audio transceiver 360 of the transceiver device 355 and/or from a text/audio transceiver 375 of the transceiver device 370. The inputs can be received over network 350 (e.g., network 150 of FIG. 1) and/or a cellular network (not shown).

The preprocessing module 315 can be configured to format, normalize, modify, or otherwise process the input text and/or audio. In embodiments, for audio inputs, the preprocessing module 315 can be configured to convert speech within the audio input to text (e.g., via speech-to-text conversion). Any suitable preprocessing techniques can be utilized such that further processing of inputs can be completed. For example, preprocessing techniques can include, but are not limited to, adjusting text format, lowercasing, stemming, lemmatization, part of speech (POS) tagging, normalization, stopword removal, sentence breaking, parsing, noise removal, named entity recognition (NER), sentiment analysis, relationship extraction, and tokenization, among other techniques.

The key element extractor 320 can be configured to extract key elements from text. As discussed above, key elements (e.g., text element categories) can be portions of the input text mapped to specific categories of interest that a user may desire to modify. For example, as shown in FIG. 2, key element categories include "time," "name," "address," "number," and "location." Thus, based on the specific key elements present within different text modification schemes, key elements can be extracted from text such that portions of text can be mapped to text modifications within the structured table including text modification schemes 337. In embodiments, key elements can be extracted from text using artificial intelligence algorithms (e.g., support vector machines (SVMs) and/or convolutional neural networks (CNNs)). An example service provided by IBM® capable of extracting and categorizing portions of text within text inputs is WATSON® Natural Language Classifier (NLC).

A text modification cluster generator 325 can be configured to generate clusters (e.g., corresponding to text modification schemes). A cluster can correspond to an identification of a text modification scheme present within the structured table including text modification schemes 337. In embodiments, upon training the text management system 305, textual data within the historical text data store 340 can be analyzed such that one or more clusters can be generated by the text modification cluster generator 325. For example, historical text data of one or more users can be analyzed and one or more clusters corresponding to text modification schemes can be generated based on the analysis. The analysis can consider the frequency and type of text modifications made by users as indicated in their historical text data. For example, a user that commonly bolds and underlines text elements can be assigned to a cluster associated with a text modification scheme that includes bolding and underlining as text modification options.

In embodiments, clusters can be generated in response to users not matching currently existing clusters (e.g., by a certain margin) based on an analysis of user data within historical text data store 340. Thus, in embodiments, upon determining that a user does not match an existing cluster within the structured table including text modification schemes 337, then a new cluster (and thus new text modification scheme) can be generated by the text modification cluster generator 325.

A text modification cluster classifier 330 can be configured to classify new users into existing clusters (e.g., corresponding to text modification schemes). Thus, in response to a user matching to a cluster (e.g., a substantial match is determined), then the user can be classified into the cluster. In embodiments, text history of users can be re-analyzed over time such that users can be reclassified into existing clusters. For example, if a user frequently uses more and/or different text modifications over a given time period, a determination can be made the reclassify the user from a first cluster into a second cluster. The second cluster may more closely mirror the user's text modification usage.

Any suitable classification/clustering techniques can be used to classify users into new and/or existing clusters. For example, clustering models that can be used to classify users into clusters representing text modification schemes include, but are not limited to connectivity models (e.g., hierarchical clustering), centroid models (e.g., k-means clustering), distribution models (e.g., clusters modeled using statistical distributions), density models, graph-based models, signed graph models, and neural models (e.g., principal component analysis). Classification models that can be used to classify users into clusters representing text modification schemes include, but are not limited to, logistic regression, k-nearest neighbors, decision trees, support vector machines, Naïve Bayes, learning vector quantization, and neural networks. The clustering and/or classification models can consider the type and frequency of text modifications made by users in the past. In embodiments, text associated with users can be encoded (e.g., using word2vec) such that a model can properly classify the users into appropriate clusters.

A text modifier 335 of the text management system 305 can be configured to modify input text of users according to the structured table including text modification schemes 337. That is, upon extracting key elements from a text input and identifying a cluster the user belongs to, the structured table including text modification schemes 337 can be referenced such that mappings of text elements to text modifications can be ascertained. Thereafter, the text within the input text can be modified according to the text modifications indicated within the structured table including text modification schemes 337. For example, referring to FIG. 2, user "Tony" belongs to "Cluster ID 3." The input message "Sounds good John and Mary, I will see you at room 206 at 9:00 AM on Monday" can be modified according to the text modification scheme corresponding to cluster 3. In particular, the text can be modified to "Sounds good John and Mary, I will see you at room 206 at 9:00 AM on Monday." This is completed by following the mappings: name→italic, location→bold, and time→bold within table 225. Thus, the text modifier 335 can be configured to perform modification actions on text based on determined mappings.

In embodiments, users can be recommended text modifications based on the structured table including text modification schemes 337. In these embodiments, the user can choose whether to adopt the recommendation presented by the text management system 305. In embodiments, if the user chooses to not adopt the text modification recommendation, the user may manually modify the text in a desired manner. Thereafter, a determination can be made whether the user should be mapped to a new or existing cluster based on the user's specific text modifications. For example, data within rows of structured table 225 can be altered based on the user's manual modifications and a new cluster can be assigned based on the modified data cells.

For example, assume in the example provided within FIG. 2, that Tony was presented a recommended text modification of "Sounds good John and Mary, I will see you at room 206 at 9:00 AM on Monday" based on his text input. In this example, assume Tony rejected the recommended text modification and modified his text manually with "Sounds good John and Mary, I will see you @room 206 at 9:00 AM on Monday." In this example, Tony rejected the text modification scheme associated with Cluster ID 3 and manually modified his input text in a manner similar to Cluster ID 2. Thus, Tony can be reassigned to Cluster ID 2 based on his rejection of the recommended text modification and his specific manual modification.

It is noted that FIG. 3 is intended to depict the representative major components of an example computing environment 200. In some embodiments, however, individual components can have greater or lesser complexity than as represented in FIG. 3, components other than or in addition to those shown in FIG. 3 can be present, and the number, type, and configuration of such components can vary. For example, in embodiments, one or more elements of text management system 305 may be disposed within transceiver devices 355 and 370.

Figure 4:
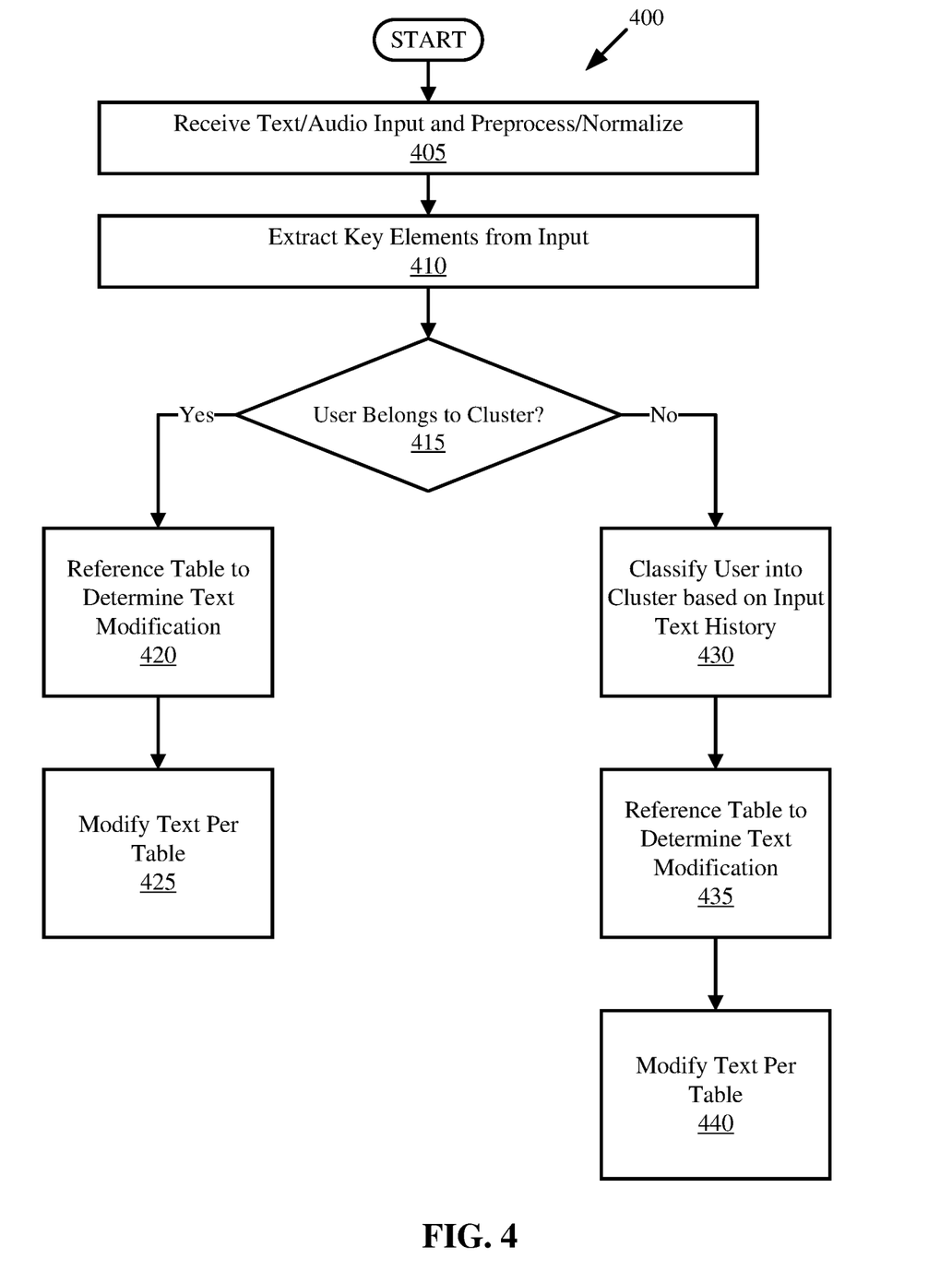
FIG. 4 is a flow-diagram illustrating an example method for input text modification, in accordance with embodiments of the present disclosure.

Referring now to FIG. 4, shown is a flow diagram of an example method 400 for text management, in accordance with embodiments of the present disclosure. One or more operations of method 400 can be completed by one or more processing circuits (e.g., devices 105, server 135, text management system 305).

Method 400 initiates at operation 405, where textual and/or audio inputs are received and the inputs are preprocessed and/or normalized. Input text and/or audio can be received in the same, or a substantially similar manner, as described with respect to the input receiver 310 of FIG. 3. Input text and/or audio can be preprocessed and/or normalized in the same, or a substantially similar manner, as described with respect to the preprocessing module 315 of FIG. 3. For example, text and/or audio data can be received over a network and preprocessed using natural language processing (NLP) techniques.

Key elements are then extracted from the input. This is illustrated at operation 410. Key elements refer to key categories of text which a user may desire to modify. Example key element categories include name, location, and time. Key elements can be extracted using artificial intelligence and machine learning algorithms such as SVMs and CNNs. However, key elements can be extracted in any suitable manner.

A determination is made whether a user that provided the input belongs to an existing cluster. This is illustrated at operation 415. Determining whether the user belongs to an existing cluster can be completed by referencing identification headers within a structured table specifying text modification schemes. If the user matches an ID present within a structured table, a determination can be made whether the user is assigned to an existing cluster by reading the data row/column the user is associated with. If a determination is made that the user does not match an ID within the structured table, or a determination is made that the user is not currently assigned to an existing cluster by reading the data row/column the user is associated with, then a determination can be made that the user does not belong to an existing cluster.

If a determination is made that the user belongs to an existing cluster at operation 415 ("Yes" at operation 415), then a table is referenced to determine a text modification scheme for the user. This is illustrated at operation 420. Thereafter, the input text is modified per the key element to text modification mappings within the table. This is illustrated at operation 425. FIG. 2 depicts example text modifications made based on key element to text modification mappings within structured table 225.

If a determination is made that the user does not belong to an existing cluster at operation 415 ("No" at operation 415), then the user is classified into a cluster based on their input text history. This is illustrated at operation 430. For example, the user can be classified into an existing cluster using a clustering/classification algorithm based on the frequency and type of text modifications the user has made in the past. In some embodiments, a new cluster can be generated for the user if a match is not found to an existing cluster.

Upon classifying the user into a cluster (e.g., or generating a new cluster for the user), a table is referenced to determine a text modification scheme for the user. This is illustrated at operation 435. Thereafter, the input text is modified per the key element to text modification mappings within the table. This is illustrated at operation 440.

The aforementioned operations can be completed in any order and are not limited to those described. Additionally, some, all, or none of the aforementioned operations can be completed, while still remaining within the spirit and scope of the present disclosure.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and personal digital assistants (PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
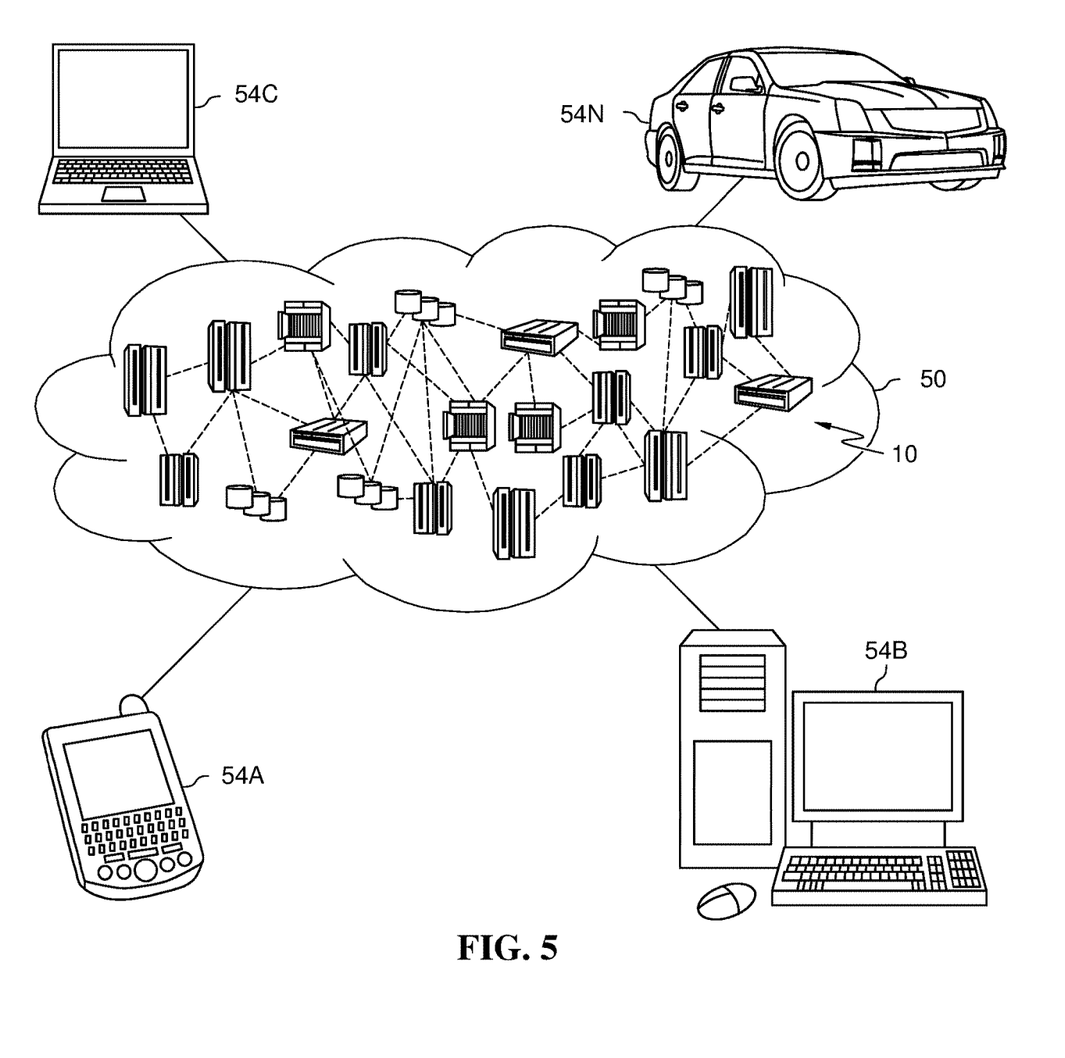
FIG. 5 is a diagram illustrating a cloud computing environment, in accordance with embodiments of the present disclosure.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A (e.g., devices 105), desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
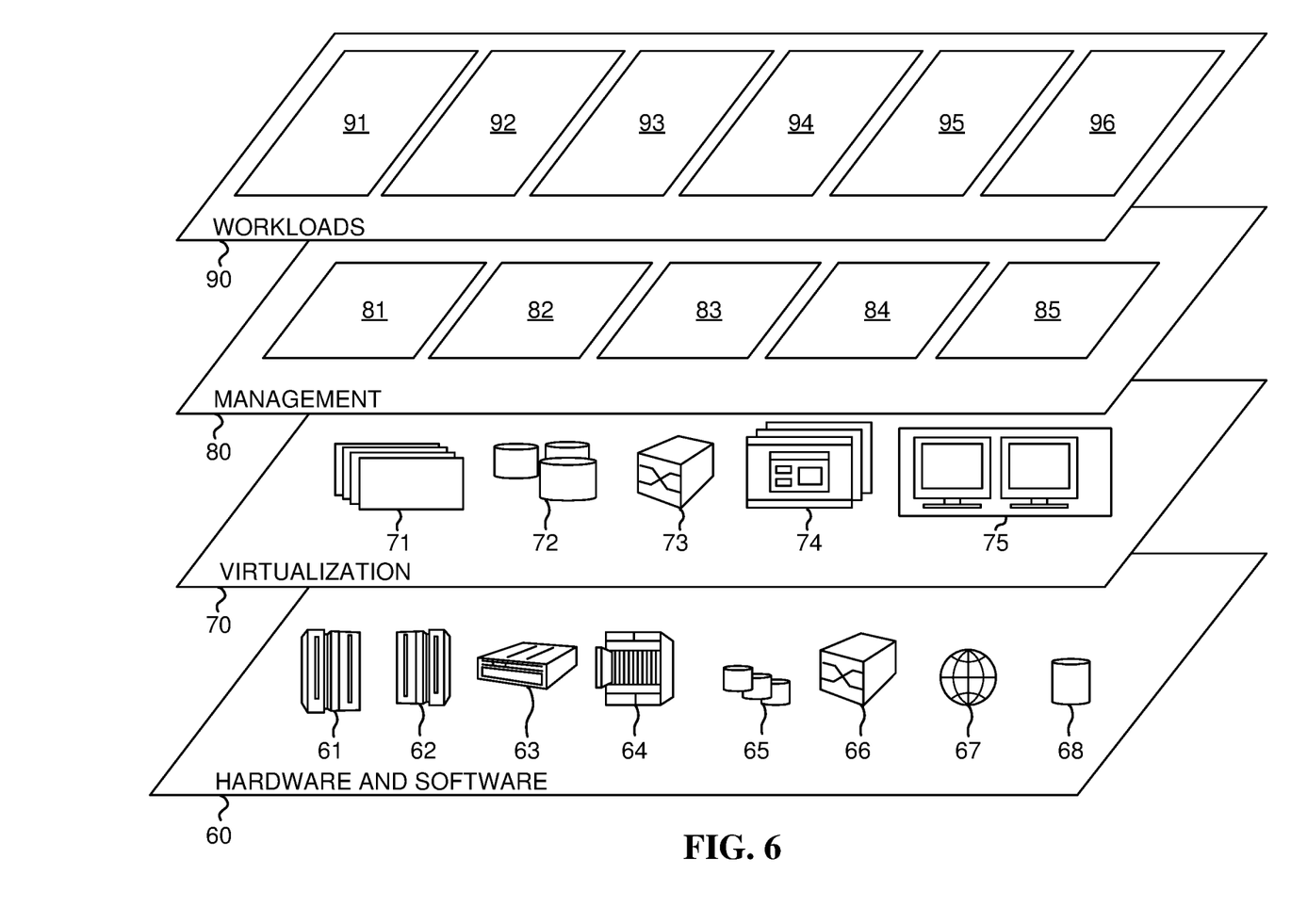
FIG. 6 is a block diagram illustrating abstraction model layers, in accordance with embodiments of the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and text management 96.

Figure 7:
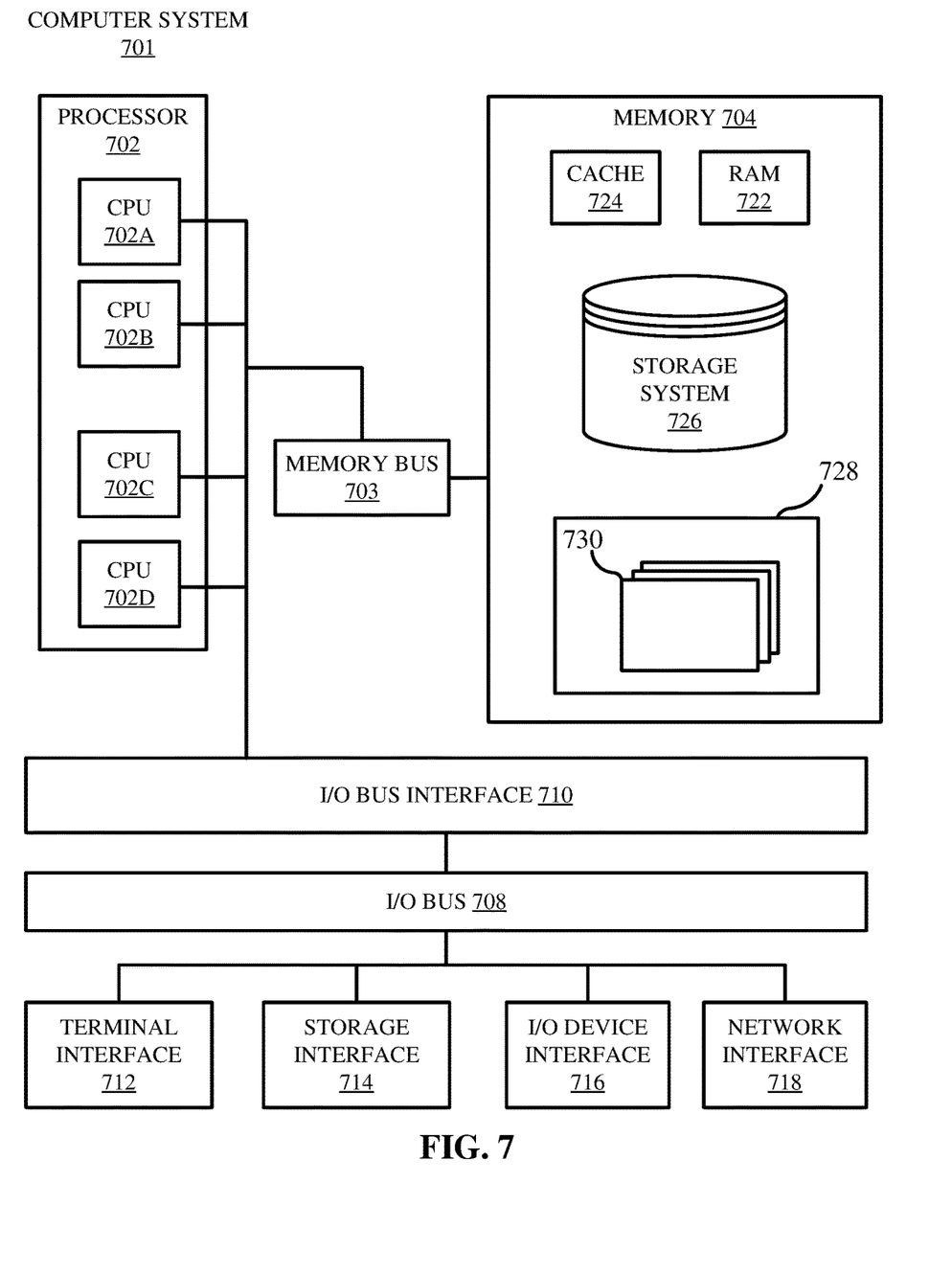
FIG. 7 is a high-level block diagram illustrating an example computer system that may be used in implementing one or more of the methods, tools, and modules, and any related functions, described herein, in accordance with embodiments of the present disclosure.

Referring now to FIG. 7, shown is a high-level block diagram of an example computer system 701 (e.g., devices 105 and server 135) that may be used in implementing one or more of the methods, tools, and modules, and any related functions, described herein (e.g., using one or more processor circuits or computer processors of the computer), in accordance with embodiments of the present disclosure. In some embodiments, the major components of the computer system 701 may comprise one or more CPUs 702, a memory subsystem 704, a terminal interface 712, a storage interface 714, an I/O (Input/Output) device interface 716, and a network interface 718, all of which may be communicatively coupled, directly or indirectly, for inter-component communication via a memory bus 703, an I/O bus 708, and an I/O bus interface unit 710.

The computer system 701 may contain one or more general-purpose programmable central processing units (CPUs) 702A, 702B, 702C, and 702D, herein generically referred to as the CPU 702. In some embodiments, the computer system 701 may contain multiple processors typical of a relatively large system; however, in other embodiments the computer system 701 may alternatively be a single CPU system. Each CPU 702 may execute instructions stored in the memory subsystem 704 and may include one or more levels of on-board cache.

System memory 704 may include computer system readable media in the form of volatile memory, such as random access memory (RAM) 722 or cache memory 724. Computer system 701 may further include other removable/non-removable, volatile/non-volatile computer system storage media. By way of example only, storage system 726 can be provided for reading from and writing to a non-removable, non-volatile magnetic media, such as a "hard-drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 704 can include flash memory, e.g., a flash memory stick drive or a flash drive. Memory devices can be connected to memory bus 703 by one or more data media interfaces. The memory 704 may include at least one program product having a set (e.g., at least one) of program modules that are configured to carry out the functions of various embodiments.

One or more programs/utilities 728, each having at least one set of program modules 730 may be stored in memory 704. The programs/utilities 728 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 728 and/or program modules 730 generally perform the functions or methodologies of various embodiments.

Although the memory bus 703 is shown in FIG. 7 as a single bus structure providing a direct communication path among the CPUs 702, the memory subsystem 704, and the I/O bus interface 710, the memory bus 703 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 710 and the I/O bus 708 are shown as single respective units, the computer system 701 may, in some embodiments, contain multiple I/O bus interface units 710, multiple I/O buses 708, or both. Further, while multiple I/O interface units are shown, which separate the I/O bus 708 from various communications paths running to the various I/O devices, in other embodiments some or all of the I/O devices may be connected directly to one or more system I/O buses.

In some embodiments, the computer system 701 may be a multi-user mainframe computer system, a single-user system, or a server computer or similar device that has little or no direct user interface, but receives requests from other computer systems (clients). Further, in some embodiments, the computer system 701 may be implemented as a desktop computer, portable computer, laptop or notebook computer, tablet computer, pocket computer, telephone, smart phone, network switches or routers, or any other appropriate type of electronic device.

It is noted that FIG. 7 is intended to depict the representative major components of an exemplary computer system 701. In some embodiments, however, individual components may have greater or lesser complexity than as represented in FIG. 7, components other than or in addition to those shown in FIG. 7 may be present, and the number, type, and configuration of such components may vary.

As discussed in more detail herein, it is contemplated that some or all of the operations of some of the embodiments of methods described herein can be performed in alternative orders or may not be performed at all; furthermore, multiple operations can occur at the same time or as an internal part of a larger process.

The present disclosure can be a system, a method, and/or a computer program product. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But, the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A method comprising:

analyzing historical text data of a user to determine a frequency and a type of text modifications made by the user on particular key elements within the historical text data;

assigning the user to a first cluster of a plurality of clusters based on the analysis of the historical text data associated with the user, wherein the user is assigned to the first cluster based on the frequency and the type of text modifications made by the user on the particular key elements;

receiving input text from the user;

extracting a set of key elements from the input text;

referencing, a structured table mapping each of the plurality of clusters to a respective text modification scheme within the structured table; and modifying, in response to determining that the user is assigned to the first cluster, the input text according to the referenced structured table mapping the first cluster to a first text modification scheme within the structured table, wherein the first text modification scheme includes a first mapping of the extracted key elements to text modifications.

2. The method of claim 1, wherein the set of key elements are extracted using a convolutional neural network (CNN).

3. The method of claim 1, wherein a second cluster within the structured table is mapped to a second text modification scheme including a second mapping of key elements to text modifications.

4. The method of claim 3, wherein a second user is classified into the second cluster based on historical text data of the second user.

5. The method of claim 4, wherein the second user is reclassified into a third cluster within the structured table mapped to a third text modification scheme, the third text modification scheme including a third mapping of key elements to text modifications.

6. The method of claim 1, wherein the key elements include a name category, a location category, and a time category.

7. The method of claim 1, wherein text modifications include bolding, italicizing, coloring, and underlining.

8. A system comprising:

one or more processors; and one or more computer-readable storage media storing program instructions which, when executed by the one or more processors, are configured to cause the one or more processors to perform a method comprising:

analyzing historical text data of a user to determine a frequency and a type of text modifications made by the user on particular key elements within the historical text data;

assigning the user to a first cluster of a plurality of clusters based on the analysis of the historical text data associated with the user, wherein the user is assigned to the first cluster based on the frequency and the type of text modifications made by the user on the particular key elements;

receiving input text from the user;

extracting a set of key elements from the input text;

referencing a structured table mapping each of the plurality of clusters to a respective text modification scheme within the structured table; and modifying, in response to determining that the user is assigned to the first cluster, the input text according to the referenced structured table mapping the first cluster to a first text modification scheme within the structured table, wherein the first text modification scheme includes a first mapping of the extracted key elements to text modifications.

9. The system of claim 8, wherein the set of key elements are extracted using a convolutional neural network (CNN).

10. The system of claim 8, wherein a second cluster within the structured table is mapped to a second text modification scheme including a second mapping of key elements to text modifications.

11. The system of claim 10, wherein a second user is classified into the second cluster based on historical text data of the second user.

12. The system of claim 11, wherein the second user is reclassified into a third cluster within the structured table mapped to a third text modification scheme, the third text modification scheme including a third mapping of key elements to text modifications.

13. The system of claim 8, wherein the key elements include a name category, a location category, and a time category.

14. The system of claim 8, wherein text modifications include bolding, italicizing, coloring, and underlining.

15. A computer program product comprising one or more computer readable storage media, and program instructions collectively stored on the one or more computer readable storage media, the program instructions comprising instructions configured to cause one or more processors to perform a method comprising:

analyzing historical text data of a user to determine a frequency and a type of text modifications made by the user on particular key elements within the historical text data;

assigning the user to a first cluster of a plurality of clusters based on the analysis of the historical text data associated with the user, wherein the user is assigned to the first cluster based on the frequency and the type of text modifications made by the user on the particular key elements;

receiving input text from the user;

extracting a set of key elements from the input text;

referencing a structured table mapping each of the plurality of clusters to a respective text modification scheme within the structured table; and modifying, in response to determining that the user is assigned to the first cluster, the input text according to the referenced structured table mapping the first cluster to a first text modification scheme within the structured table, wherein the first text modification scheme includes a first mapping of the extracted key elements to text modifications.

16. The computer program product of claim 15, wherein a second cluster within the structured table is mapped to a second text modification scheme including a second mapping of key elements to text modifications.

17. The computer program product of claim 16, wherein a second user is classified into the second cluster based on historical text data of the second user.

18. The computer program product of claim 17, wherein the second user is reclassified into a third cluster within the structured table mapped to a third text modification scheme, the third text modification scheme including a third mapping of key elements to text modifications.

19. The computer program product of claim 15, wherein the key elements include a name category, a location category, and a time category.

20. The computer program product of claim 15, wherein text modifications include bolding, italicizing, coloring, and underlining.

\* \* \* \* \*